(12) United States Patent
Jain et al.

(10) Patent No.: US 11,972,636 B2
(45) Date of Patent: Apr. 30, 2024

(54) SYSTEM AND METHOD OF DETERMINING AN EMOTIONAL STATE OF A USER

(71) Applicant: RingCentral, Inc., Belmont, CA (US)

(72) Inventors: Nitesh Jain, San Francisco, CA (US); Shazeeye Kirmani, Menlo Park, CA (US); Evelin Goldstein, Woodinville, WA (US); Anam Barakzai, Belmont, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/948,780

(22) Filed: Sep. 30, 2020

(65) Prior Publication Data
US 2022/0100990 A1    Mar. 31, 2022

(51) Int. Cl.
*G06V 40/16*    (2022.01)
*H04N 7/15*     (2006.01)

(52) U.S. Cl.
CPC .............. *G06V 40/174* (2022.01); *H04N 7/15* (2013.01)

(58) Field of Classification Search
USPC .................................. 348/14.07, 14.02–14.8
See application file for complete search history.

(56) References Cited

U.S. PATENT DOCUMENTS

| | | | |
|---|---|---|---|
| 2008/0091515 A1* | 4/2008 | Thieberger | G06Q 10/04 705/7.11 |
| 2011/0295392 A1* | 12/2011 | Cunnington | G06Q 10/10 702/19 |
| 2013/0097176 A1* | 4/2013 | Khader | G06Q 30/0251 707/748 |
| 2015/0324352 A1* | 11/2015 | Meyer | G10L 15/25 382/103 |
| 2017/0308267 A1* | 10/2017 | Kozloski | G06F 3/04812 |
| 2018/0090137 A1* | 3/2018 | Horling | G06F 16/9535 |
| 2019/0188552 A1* | 6/2019 | Andersen | H04L 67/306 |
| 2019/0236968 A1* | 8/2019 | Otwell | G09B 5/02 |
| 2019/0251359 A1* | 8/2019 | Pranger | G06V 40/174 |

* cited by examiner

*Primary Examiner* — Maria El-Zoobi (57) ABSTRACT

A computer-implemented method for determining an emotional state of a user based on a facial expression of the user and causing to display the emotional state of the user to the user is provided.

23 Claims, 5 Drawing Sheets

SYSTEM AND METHOD OF DETERMINING AN EMOTIONAL STATE OF A USER

TECHNICAL FIELD

The present disclosure relates generally to the field of video conferences. Specifically, the present disclosure relates to systems and methods for determining an emotional state of a user during a video conference.

BACKGROUND

Online and virtual meetings have become a prominent feature of conducting business in light of the multi-locational aspect of most businesses. Use and importance of online and virtual meetings have been heightened due to shelter-in-place restrictions that were instituted in response to the COVID-19 pandemic, along with a concomitant trend towards companies allowing more remote working and the resulting migration of many employees to more remote suburbs, or even different cities, states, or countries.

It is not common to provide each user with information about his or her own visualization and appearance and how they are presented to or may be perceived by other participants.

SUMMARY

The appended claims may serve as a summary of the invention.

DETAILED DESCRIPTION

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

In some embodiments, a computer-implemented method for determining an emotional state of a user comprises obtaining a facial expression of the user, determining the emotional state of the user based on the facial expression of the user, and causing to display the emotional state of the user to the user.

In another embodiment a system for determining an emotional state of a user, comprising: a memory storing a set of instructions, and at least one processor configured to execute the instructions to: obtain facial expression of the user, determine the emotional state of the user based on the facial expression of the user, and causing to display the emotional state of the user to the user.

In yet another embodiment a web-based server for determining an emotional state of a user, comprising: a memory storing a set of instructions, and at least one processor configured to execute the instructions to: obtain facial expression of the user, determine the emotional state of the user based on the facial expression of the user, and causing to display the emotional state of the user to the user.

In some embodiments, the systems and methods described herein enable browser-based conferencing. For example, the system may obtain facial expressions of the user while the user is engaged in a browser-based conferencing session. Once the emotional state of the user has been determined, the system subsequently causes the displaying of emotional states, behavioral information, or any other information pertaining to the user directly to the same user through a web browser.

In some embodiments, the systems and methods described herein are implemented on one or more servers. In other embodiments, the systems and methods described herein are implemented on one or more endpoint computing devices. For example, the methods described herein for obtaining facial expressions of the user, determining the emotional state of said user, and displaying the emotional state to the same user may be implemented by a server or by a user device associated with the user.

Figure 1:
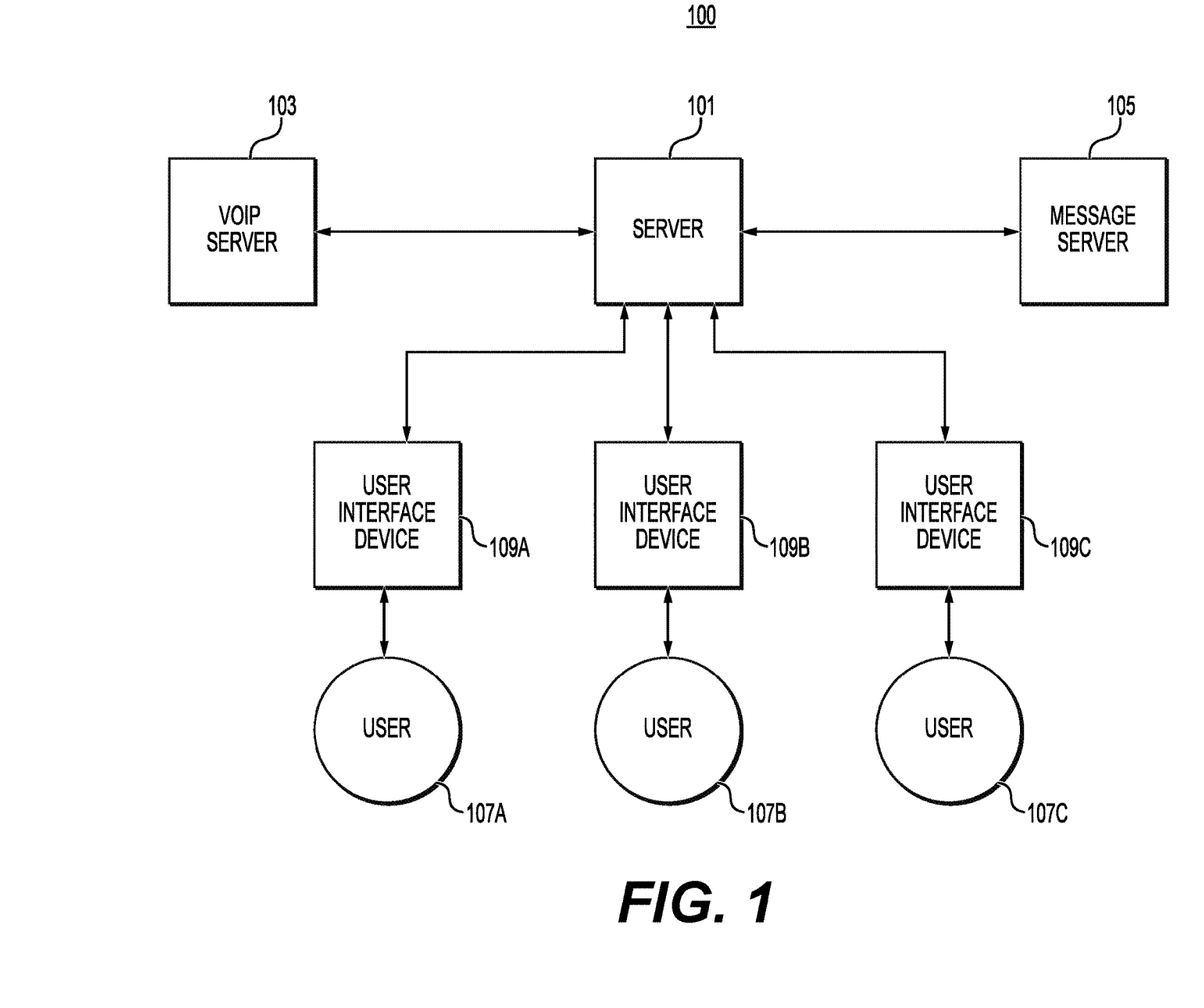
FIG. 1 is a diagram of a collaboration system, in accordance with some embodiments of the present disclosure.

Turning now to FIG. 1, there is shown a diagram of example system 100 for collaboration. As depicted in FIG. 1, system 100 may include a Server 101. Server 101 may comprise collaboration server or any other appropriate general or specialized computer. Although depicted as a single server in FIG. 1, Server 101 may comprise a plurality of servers. The plurality of servers may be housed within one server farm or distributed across a plurality of server farms.

Server 101 may be operably connected to one or more Voice over Internet Protocol (VoIP) servers (e.g., VOIP server 103) and to one or more message server (e.g., message server 105). In some embodiments, VoIP server 103 and/or message server 105 may comprise one or more servers. For example, one or more of the servers comprising VoIP server 103 and/or message server 105 may be one or more of the same servers comprising Server 101. In certain aspects, one or more of the servers comprising VoIP server 103 and/or message server 105 may be housed within one or more of the same server farms as Server 101 or may be distributed across one or more different server farms.

As depicted in FIG. 1, system 100 further includes a plurality of users, e.g., user 107a, user 107b, and user 107c. Although FIG. 1 depicts system 100 as having three users, one skilled in the art would understand that system 100 may have any number of users.

As further depicted in FIG. 1, each user within system 100 is operably connected to the system via at least one user interface device. For example, user 107a is connected via user interface device 109a, user 107b is connected via user interface device 109b, and user 107c is connected via user interface device 109c. A user interface device may comprise, for example, a smartphone, a tablet, a laptop computer, a desktop computer, or the like. Although not depicted in FIG. 1, one or more users may also be separately operably connected to VoIP server 103 and/or message server 105 via the same and/or a different user interface device. User interface devices may comprise video input (e.g. built-in camera) and video output (e.g. display).

Server 101 may perform one or more of the disclosed methods to determine an emotional state of the user 107a. For example, Server 101 may obtain a facial expression of the user 107a using the user interface device 109a. Server 101 may determine the emotional state of the user 107a based on the facial expression of the user 107a and display the determined emotional state of the user 107a directly to the user 107a. In a preferable embodiment, the emotional state of the user 107a is displayed only to user 107a while no information is displayed to user 107b, user 107c, or any other user.

VoIP server 103 handles audio communications from the user 107a including his phone calls, audio messages, etc.

Message server 105 handles text communications from the user 107a including SMS, messenger communications, collaboration tool text messages.

Information obtained by Server 101 from the VoIP server 103 and message server 105 is context information of the user 107a. The VoIP server provides an information about audio communications that user 107a had recently and about content of the audio communications. In another embodiment the VoIP server 103 provides information about ongoing audio communications during an ongoing conference session. The message server 105 provides information about the user's 107a past text communications and ongoing activity in messaging applications.

Figure 2:
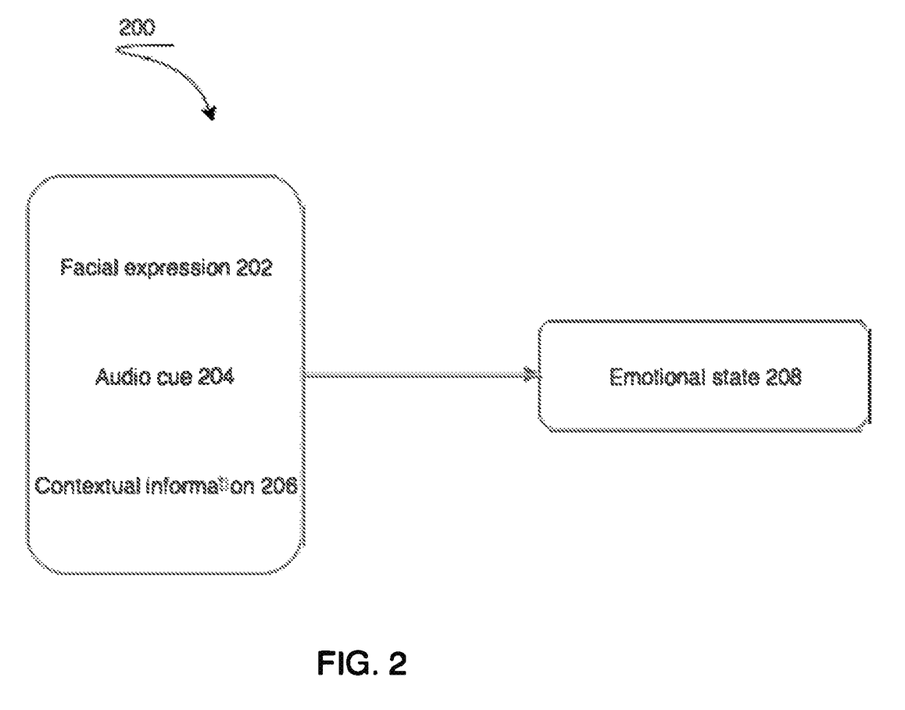
FIG. 2 is a diagram of a method of determining an emotional state of a user, in accordance with some embodiments of the present disclosure.

Referring now to FIG. 2 there is shown a diagram 200 of determining an emotional state 208 of a user, for example a user 107a. Server 101 determines the emotional state 208 of the user 107a based on an obtained facial expression 202 of the user 107a. Specifically, Server 101 uses known facial expression patterns to determine the emotional state 208 of the user 107a. For example, Server 101 comprises a database (not shown) where average patterns of facial expressions are stored. Average patterns of facial expressions should be understood as a set of facial countenances that are common across a majority of the population when expressing predefined emotions. For example, a set of facial countenances that comprise of raised and curved eyebrows, stretched skin below the brow, horizontal wrinkles across the forehead, opened eyelids, the whites of the eye showing above and below the pupil, dropped jaw, parted teeth, and little or no tension or stretching of the mouth shows the emotion of "surprise" that is common among an average population of people. Server 101 compares the captured facial expression of the user 107a obtained through the user interface device 109a with the known patterns of facial expressions, and based on a match, determines the emotional state of the user 107a.

In another embodiment, Server 101 uses known machine learning algorithms to determine the emotional state of the user 107a. Known machine learning algorithm can be trained using historical user 107a facial expressions with associated emotional state of the user 107a. Using a standard neural network as a general example of an Artificial Intelligence (AI) model, a neural network utilizes an input layer, one or more hidden layers, and an output layer to train the machine learning algorithm(s) or model. In some embodiments, where the outputs have already been labeled and confirmed, supervised learning is used such that known input data, a weighted matrix, and known output data are used to gradually adjust the model to accurately compute the already known output. In other embodiments, where the output data has not yet been confirmed, unstructured learning is used such that a model attempts to reconstruct known input data over time in order to learn.

Training of the above neural network example using one or more training input matrices, a weight matrix, and one or more known outputs is initiated by one or more computers associated with the system, such as Server 101. In an embodiment, Server 101 may run known input data through a deep neural network in an attempt to compute a particular known output. For example, Server 101 uses a first training input matrix and a default weight matrix to compute an output. If the output of the deep neural network does not match the corresponding known output of the first training input matrix, Server 101 adjusts the weight matrix, such as by using stochastic gradient descent, to slowly adjust the weight matrix over time. Server 101 then re-computes another output from the deep neural network with the input training matrix and the adjusted weight matrix. This process continues until the processor output matches the corresponding known output. Server 101 then repeats this process for each training input dataset until a fully trained model is generated. For the purposes of this disclosure, the machine learning algorithms may be trained using publicly available data, company-specific data, and/or any other types of training data.

In another embodiment, the emotional state of the user 107a can be determined based on an audio cue 204 received from the user 107a by Server 101 through the built-in microphone in the user interface device 109a. The audio cue 204 is an audio feed produced by the user (e.g. the user 107a). The audio cue 204 may include speech from the user 107a, emotional sounds from the user 107a, and/or any other audio produced by the user 107a. Server 101 analyses vocal patterns from the user 107a. In an embodiment, Server 101 creates a spectrum graph of user 107a's audio cue 204, determines one or more maximum amplitudes of the audio cue 204, and calculates a frequency ratio for the found maximum amplitudes of the audio cue 204. For example, if the frequency ratios for the found maximum amplitudes are 0.50, 0.69 and 0.61, then the emotional state of user 107a is determined to be "surprise." If the frequency ratios for the found maximum amplitudes are 0.62, 0.58 and 0.67, then the emotional state of user 107a is determined to be "disgust." If the frequency ratios for the found maximum amplitudes are 0.69, 0.50 and 0.67, then the emotional state of user 107a is determined to be "anger." If the frequency ratios for the found maximum amplitudes are 0.74, 0.67 and 0.81, then the emotional state of user 107a is determined to be "fear." If the frequency ratios for the found maximum amplitudes are 0.79, 0.75 and 0.59, then the emotional state of user 107a is determined to be "happy." If the frequency ratios for the found maximum amplitudes are 0.84, 0.75 and 0.63, then the emotional state of user 107a is determined to be "sad."

In another embodiment, the emotional state 208 of the user can be determined using known machine learning algorithms. For example the conference server 101 can use a data from different databases that comprise known patterns like emotion in child-robot interaction (Steidl, 2009), communication with virtual humans (McKeown et al., 2012), sets from controlled experiments, featuring, emotions expressed ("enacted") by professional actors, with restricted linguistic content (e.g., phonetically balanced pseudo sentences) with the goal to allow for domain-independent analysis of the variation of vocal parameters (Burkhardt et al., 2005; Banziger et al., 2012) or categorization of music databases on end-user devices ("music mood recognition"; Yang and Chen, 2012), emotion analysis of general sounds database (Sundaram and Schleicher, 2010; Drossos et al., 2012; Schuller et al., 2012) or the Geneva Multimodal Emotion Portrayals (GEMEP) set as an example for enacted emotional speech; the Vera am Mittag (VAM) database as an example for spontaneous emotional speech "sampled" from a "real-life" context; the "Now That's What I Call Music" (NTWICM) database for mood recognition in popular music. Using all this data, Server 101 can be trained to determine the emotional state 208 of the user based on the obtained audio cue 204.

In some embodiments, the emotional state 208 of the user is determined based on biometric data. The biometric data includes, for example, heart rate or pulse rate, blood pressure, blood sugar levels, brain activity, pupil size, pupil dilation reactions, or any other type of biometric data. In an embodiment, the biometric data may be obtained using wearable devices, such as smart watches, smart glasses, fitness devices, general IoT devices, or any other device.

In some embodiments, Server 101 uses machine learning algorithms to determine the emotional state of the user 107a by training the machine learning model to recognize certain biometric readings as indicators of certain emotions. For example, the machine learning model may be trained to identify a certain level of elevated heart rate, in combination with shrunken pupil size, as an indicator for "anger." Once trained, live or field data may be fed through the trained model to determine the emotional state of the user. While the above example uses heart rate and pupil size, any type of biometric data, alone or in combination, may be used to train the machine learning model to identify an emotional state 208 of a user.

In another embodiment an emotional state 208 of a user can be determined by the contact server 101 using contextual information 206. The contextual information 206 may include audio communications content obtained from a VoIP server 103, text messages content obtained from a message server 105, or any other contextual information obtained from communications. The VoIP server 103 stores all audio communications of the user 107a (e.g. voice calls, audio conferences, voicemails, etc.) on a storage medium (not shown) that may be an internal component of the VoIP server 103 or an external device. The VoIP server 103 can transcribe stored audio communications of the user 107a using known speech-to-text techniques and store these translations on the storage medium with associated time stamps showing when these audio communications occurred. Server 101 may access the storage medium of the VoIP server 103 and check transcriptions of the user 107a audio communications to improve the determination of emotional states 208 of the user.

The message server 105 stores textual communications of the user 107a (e.g. SMS, messenger communications, messages from a collaboration tool, etc.) on a storage medium (not shown) that may be an internal component of the message server 105 or an external device. Server 101 may access the storage medium of the message server 105 and check the user 107a textual communications to improve determination of the emotional state 208 of the user.

Server 101 obtains information about audio communications of the user 107a and textual communications of the user 107a to determine the emotional state of the user 107a. For example, if the user 107a had recent audio communications with his supervisor who provided him with negative feedback about user 107a's performance, and the audio communication was stored and transcribed by the VoIP server 103, the emotional state of the user 107a can be determined by Server 101 as "sad." In another example, Server 101 can obtain information from the message server 105 about user 107a's past textual communications and find a message in a collaboration tool featuring words of gratitude from user 107a's colleague for his help. Based on this message, Server 101 can determine that the emotional state of the user 107a should be "happy."

Figure 3:
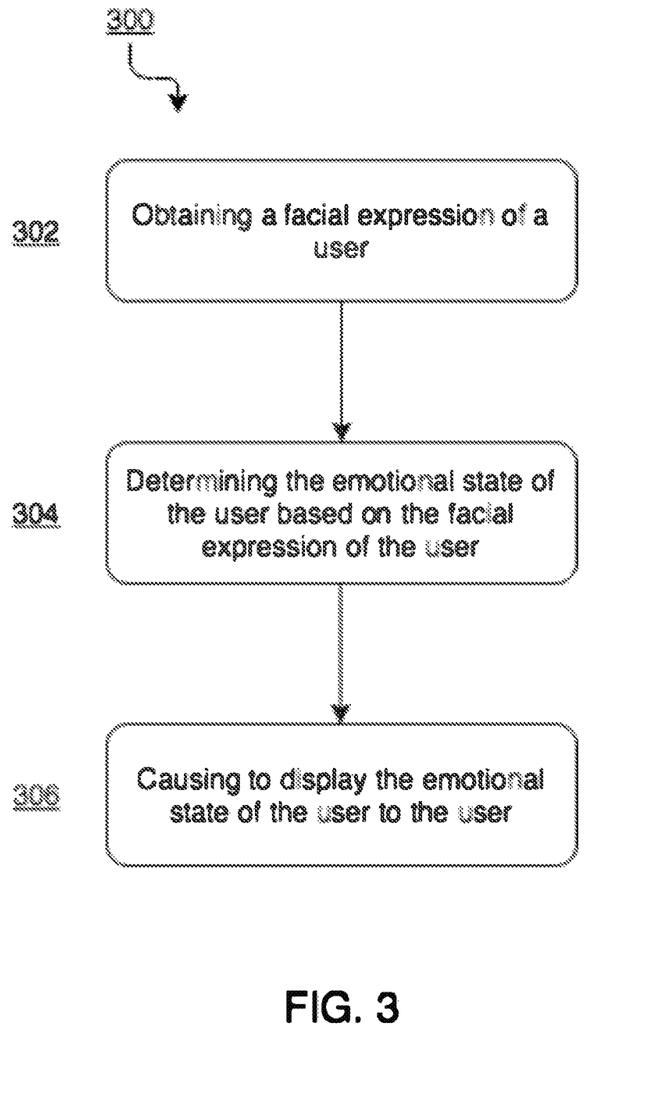
FIG. 3 is a flow chart of determining an emotional state of a user, in accordance with some embodiments of the present disclosure.

Referring now to FIG. 3, FIG. 3 depicts a flow chart 300 of a method for determining an emotional state of a user. At step 302, the method obtains a facial expression of the user. For example, Server 101 obtains the facial expression of the user 107a through a built-in camera of the user interface device 109a.

At step 304, the method determines the emotional state of the user based on the facial expression of the user, for example the server 101 determines the emotional state of the user 107a based on the facial expression of the user 107a using the techniques further described herein in relation to FIG. 2.

At step 304, the method causes to display the emotional state of the user directly to the user. For example, Server 101 causes the emotional state of the user 107a to be displayed through a built-in display of the user interface device 109a. In some embodiments, the emotional state of the user 107a is displayed using a web browser. It should be noted that, in an embodiment, no other devices (e.g. a user interface device 109b, a user interface device 109c) receive the emotional state of the user 107a from the server 101. For example, in a preferred embodiment, the server 101 sends the emotional state of user 107a to the user interface device 109a associated with user 107a, but not to any other user, such as user 107b or user 107c. Similarly, Server 101 can send information pertaining to an emotional state of user 107b to the user interface device 109b, which is associated with user 107b, to be shown on its built-in display to user 107b, but not to user 107a or user 107c. Similarly, Server 101 can send information pertaining to an emotional state of user 107c to the user interface device 109c, which is associated with user 107c, to be shown on its built-in display to the user 107c, but not use user 107a or user 107b.

In some embodiments, the emotional state of any given user is selectively sent to both the user and one or more other users. For example, the user 107a can share his emotional state 208 with other users of the conference session by instructing Server 101 through the user device 109a using an appropriate control. The user 107a can share his emotional state with one, several or all users in the video conference. The user 107a can mark users to share his emotional state 208 in a list of users of the video conference or share user's 107a emotional state 208 individually with each other participant. In some embodiments the user 107a can share the emotional state 208 with a person who is not part of the conference session. For example, this can be made by sending an electronic message to the person with an information related to the emotional state 208 of the user 107a. In some embodiments, Server 101 automatically sends the emotional state of user 107a to user 107a, user 107b, and/or user 107c. For example, as part of a program to provide feedback to user 107a on his overall appearance and emotional reactions, Server 101 may send the determined emotional state to both the user 107a, as well as user 107b, who will then provide feedback on user 107a's emotional reaction. In some embodiments, feedback from other users, such as user 107b and user 107c, may be used by an AI model to further train the machine learning algorithm to properly identify the emotional state of user 107a.

As described above, Server 101 can determine an emotional state of a user using different sources. For example, it can determine the emotional state of the user based on a facial expression of the user, an audio cue of the user, and/or contextual information of the user. It should be understood that at step 304 described above, the determination of the emotional state of the user based on the facial expression of the user can be replaced with the determination of the emotional state of the user based on the audio cue of the user or the contextual information of the user, as described above. Additionally, a combination of these techniques can be used at step 304 by Server 101. For example, Server 101 can determine the emotional state of the user (e.g. user 107a) based on the user 107a's facial expression, user 107a's audio cue, and user 107a's contextual information. All these sources can be used in combination or separately.

Server 101 can assign a importance value for each source. For example, on a scale of 1 to 3, the facial expression of the user can be assigned an importance value of 3, the audio cue of the user can be assigned an importance value of 2, and the contextual information of the user can be assigned an importance value of 1. If Server 101 first determines the emotional state of the user 107a based on the facial expression of the user 107a as "happy," then makes the same determination of the emotional state of the user 107a based on the user's audio cue, but makes a different determination based on the contextual information of the user 107a, such as determining that the emotional state of the user 107a is "anger," then Server 101 may reconcile the discrepancy using the importance value. Since the facial expression and audio cue determinations are weighted more heavily, Server 101 will display to the user 107a that his emotional state is "happy."

As another example, the determination based on the facial expression of the user and based on the audio cue of the user can both be assigned an importance value of 3 while the determination based on the context information of the user can be assigned an importance value of 1. If Server 101 determines that the emotional state of the user 107a is "disgust" based on the facial expression of the user 107a but also makes the determination that the emotional state of the user is "sad" based on the user 107a's audio cue, then Server 101 checks the determination of the emotional state of the user based on the contextual information to make a final determination as to which emotion should be displayed on the user interface device 109a. If the emotional state determined using the contextual information is "sad," then Server 101 determines the emotional state of the user 107a is "sad" and displays "sad" as the emotional state of the user 107a on the built-in display of the user interface device 109a.

Figure 4:
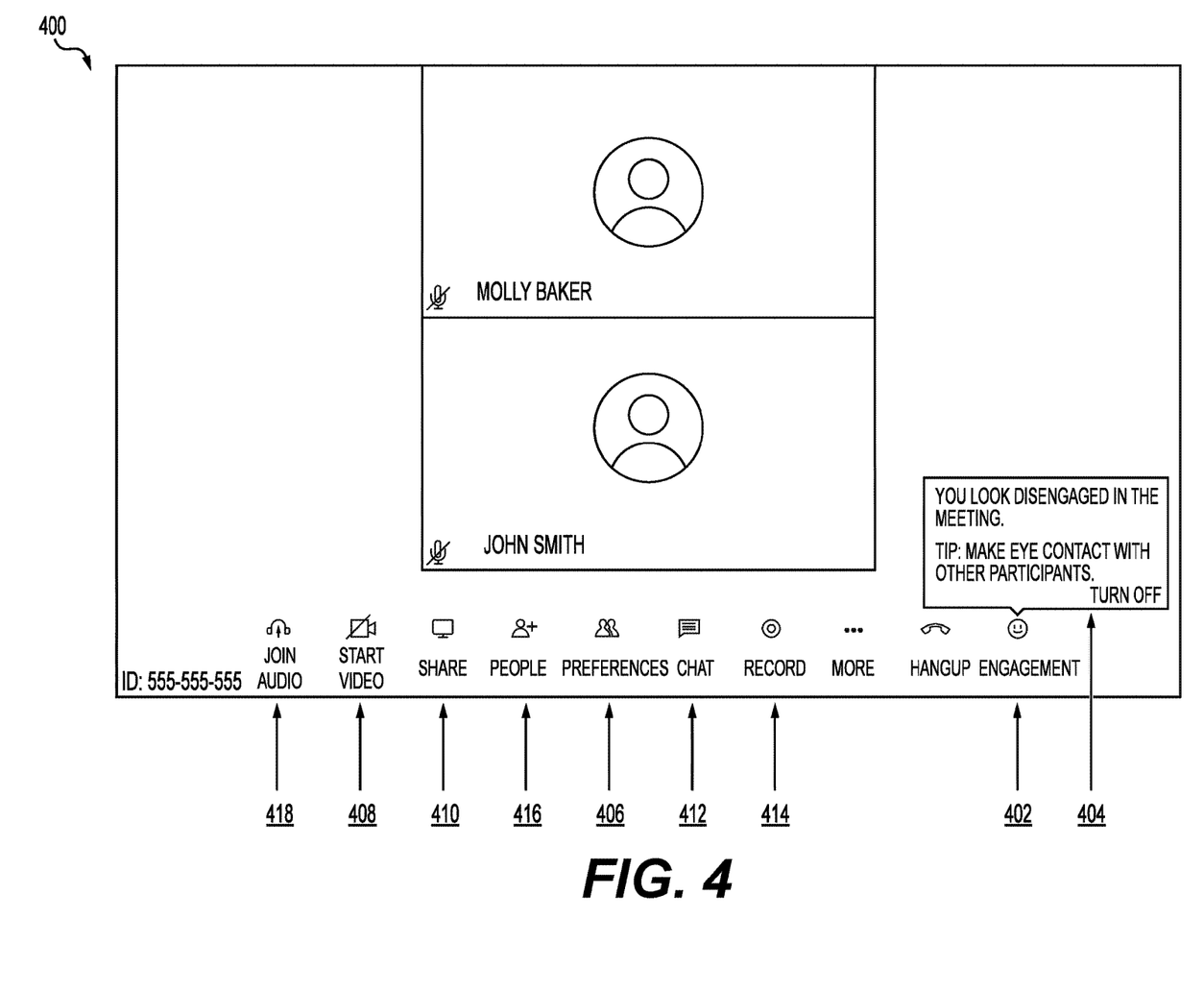
FIG. 4 is a user interface of a user interface device, in accordance with some embodiments of the present disclosure.

Referring now to FIG. 4, a user interface (UI) 400 of a video conference where the method described above can be implemented on is shown. The UI 400 is displayed on a user interface device 109a. Two other participants are present in the video conference (e.g. user 107b—Molly Baker and user 107c—John Smith). The UI 400 has standard video conference controls, including a "audio" control 418, a "record" control 414, a participants control 406, a camera control 408, a "share screen" control 410, a "chat" control 412 and an invite control 416. Additionally, the example UI 400 comprises an emotional state icon 402 of a user 107a. The emotional state icon 402 in the UI 400 is shown as emoji but it should be understood that any visualization of the emotional state of the user can be applied. The emotional state icon 402 is displayed based on the emotional state of the user determined by Server 101. The UI 400 can additionally include behavioral information 404 that can be displayed to the user 107a to improve his emotional state and increase the overall effectiveness of the video conference. The behavioral information 404 can include information about the user 107a behavior, such as a description of the emotional state determination made by Server 101. The behavioral information 404 may additionally include tips on how to improve the user's behavior and/or improve the effectiveness of the user's communications by notifying the user of how to correct the user's facial expression and/or audio cues. In embodiments where the emotional state is displayed to other users, feedback from the other users may also be used to improve the types of tips that are included in the behavioral information 404.

As shown in the FIG. 4, there is only one emotional state icon 402 that displays an aggregate emotional state of the user determined by Server 101 as described in FIG. 2 and FIG. 3. It should be noted that separate emotional state icons can be displayed in the UI 400, each associated with the emotional state of the user determined based on the facial expression 202 of the user, the audio cue 204 of the user, and/or the context information 208 of the user, respectively. Additionally, separate tips can be displayed to the user based for each separate emotional state icon 402.

Figure 5:
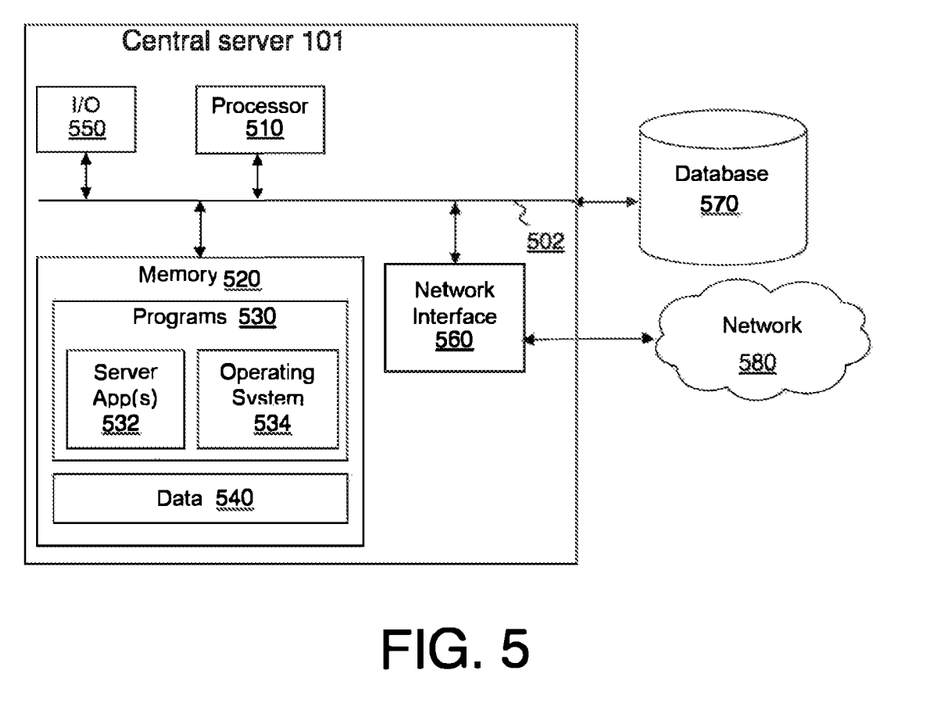
FIG. 5 is a diagram of an example conference management server, in accordance with some embodiments of the present disclosure.

FIG. 5 shows a diagram of an example Server 101, consistent with the disclosed embodiments. Server 101 includes a bus 502 (or other communication mechanism) which interconnects subsystems or components for transferring information within Server 101. As shown, Server 101 includes one or more processors 510, input/output ("I/O") devices 550, network interface 560 (e.g., a modem, Ethernet card, or any other interface configured to exchange data with a network), and one or more memories 520 storing programs 530 including, for example, server app(s) 532, operating system 534, and data 540, and can communicate with an external database (which, for some embodiments, may be included within Server 101). Server 101 may be a single server or may be configured as a distributed computer system including multiple servers, server farms, clouds, or computers that interoperate to perform one or more of the processes and functionalities associated with the disclosed embodiments.

The processor 510 may be one or more processing devices configured to perform functions of the disclosed methods, such as a microprocessor manufactured by Intel™ or manufactured by AMD™. The processor 510 may comprise a single core or multiple core processors executing parallel processes simultaneously. For example, the processor 510 may be a single core processor configured with virtual processing technologies. In certain embodiments, the processor 510 may use logical processors to simultaneously execute and control multiple processes. The processor 510 may implement virtual machine technologies, or other technologies to provide the ability to execute, control, run, manipulate, store, etc. multiple software processes, applications, programs, etc. In some embodiments, the processor 510 may include a multiple-core processor arrangement (e.g., dual, quad core, etc.) configured to provide parallel processing functionalities to allow Server 101 to execute multiple processes simultaneously. It is appreciated that other types of processor arrangements could be implemented that provide for the capabilities disclosed herein.

The memory 520 may be a volatile or non-volatile, magnetic, semiconductor, tape, optical, removable, non-removable, or other type of storage device or tangible or non-transitory computer-readable medium that stores one or more program(s) 530 such as server apps 532 and operating system 534, and data 540. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Server 101 may include one or more storage devices configured to store information used by processor 510 (or other components) to perform certain functions related to the disclosed embodiments. For example, Server 101 may include memory 520 that includes instructions to enable the processor 510 to execute one or more applications, such as server apps 532, operating system 534, and any other type of application or software known to be available on computer systems. Alternatively or additionally, the instructions, application programs, etc. may be stored in an external database 570 (which can also be internal to Server 101) or external storage communicatively coupled with Server 101 (not shown), such as one or more database or memory accessible over the network 580.

The database 570 or other external storage may be a volatile or non-volatile, magnetic, semiconductor, tape, optical, removable, non-removable, or other type of storage device or tangible or non-transitory computer-readable medium. The memory 520 and database may include one or more memory devices that store data and instructions used to perform one or more features of the disclosed embodiments. The memory 520 and database may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, Server 101 may be communicatively connected to one or more remote memory devices (e.g., remote databases 570) through the network 580. The remote memory devices can be configured to store information that Server 101 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 530 include one or more software modules configured to cause processor 510 to perform one or more functions consistent with the disclosed embodiments. Moreover, the processor 510 may execute one or more programs located remotely from one or more components of the system 100. For example, Server 101 may access one or more remote programs that, when executed, perform functions related to disclosed embodiments.

In the presently described embodiment, server app(s) 532 causes the processor 510 to perform one or more functions of the disclosed methods. For example, the server app(s) 532 cause the processor 510 to receive the facial expression of the user (e.g. user 107*a*), determine the emotional state of the user 107*a* and display determined emotional state of the user 107*a* on the user interface device 109*a*.

In some embodiments, the program(s) 530 may include the operating system 534 performing operating system functions when executed by one or more processors such as the processor 510. By way of example, the operating system 534 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 534. Server 101 may also include software that, when executed by a processor, provides communications with the network through the network interface 560 and/or a direct connection to one or more user interface devices 109A-109C.

In some embodiments, the data 540 may include, conference information received from user interface devices 109*a*, 109*b*, 109*c*, the VoIP server 103 and the message server 105 comprising data described above.

Server 101 may also include one or more I/O devices 550 having one or more interfaces for receiving signals or input from devices and providing signals or output to one or more devices that allow data to be received and/or transmitted by Server 101. For example, Server 101 may include interface components for interfacing with one or more input devices, such as one or more keyboards, mouse devices, and the like, that enable Server 101 to receive input from an operator or administrator (not shown).

What is claimed is:

1. A computer-implemented method for determining an emotional state of a user, comprising:
   obtaining a facial expression of the user;
   receiving prior communication data associated with the user, wherein the prior communication data includes at least a textual communication or an audio communication;
   determining a preliminary emotional state of the user based on the facial expression of the user;
   assigning a first importance value to the prior communication data and a second importance value to the preliminary emotional state;
   determining a final emotional state of the user based on the preliminary emotional state weighted by the second importance value and the prior communication data weighted by the first importance value; and
   causing to display the final emotional state to the user.

2. The method of claim 1, wherein determining the emotional state of the user is based on an audio cue or biometric data from the user.

3. The method of claim 1, wherein determining the emotional state of the user is based on context information.

4. The method of claim 1, wherein causing to display the emotional state of the user comprises causing to display the emotional state to the user using emojis.

5. The method of claim 1, wherein causing to display the emotional state of the user to the user comprises causing to display behavioral information.

6. The method of claim 5, wherein the behavioral information includes an improvement tip for the user.

7. The method of claim 1, wherein determining the emotional state of the user comprises determining the emotional state using artificial intelligence.

8. A system for determining an emotional state of a user, comprising:
   a memory storing a set of instructions; and
   at least one processor configured to execute the instructions to:
   obtain a facial expression of the user;
   receive prior communication data associated with the user, wherein the prior communication data includes at least a textual communication or an audio communication;
   determine a preliminary emotional state of the user based on the facial expression of the user;
   assign a first importance value to the prior communication data and a second importance value to the preliminary emotional state;
   determine a final emotional state of the user based on the preliminary emotional state weighted by the second importance value and the prior communication data weighted by the first importance value; and
   cause to display the final emotional state to the user.

9. The system of claim 8, wherein determining the emotional state of the user is based on an audio cue or biometric data from the user.

10. The system of claim 8, wherein determining the emotional state of the user is based on context information.

11. The system of claim 8, wherein causing to display the emotional state of the user comprises causing to display the emotional state to the user using emojis.

12. The system of claim 8, wherein causing to display the emotional state of the user to the user comprises causing to display behavioral information.

13. The system of claim 12, wherein the behavioral information includes an improvement tip for the user.

14. The system of claim 8, wherein determining the emotional state of the user comprises determining the emotional state using artificial intelligence.

15. A web-based server for determining an emotional state of a user, comprising:
   a memory storing a set of instructions; and
   at least one processor configured to execute the instructions to:
      obtain a facial expression of the user through a browser;
      receive prior communication data associated with the user, wherein the prior communication data includes at least a textual communication or an audio communication;
      determine a preliminary emotional state of the user based on the facial expression of the user;
      assign a first importance value to the prior communication data and a second importance value to the preliminary emotional state;
      determine a final emotional state of the user based on the preliminary emotional state weighted by the second importance value and the prior communication data weighted by the first importance value; and
      cause to display the final emotional state and a behavioral information to the user through the browser.

16. The web-based server of claim 15, wherein determining the emotional state of the user is based on an audio cue or biometric data from the user.

17. The web-based server of claim 15, wherein determining the emotional state of the user is based on context information.

18. The web-based server of claim 15, wherein causing to display the emotional state of the user comprises causing to display the emotional state to the user using emojis.

19. The web-based server of claim 15, wherein the behavioral information includes an improvement tip for the user.

20. The web-based server of claim 15, wherein determining the emotional state of the user comprises determining the emotional state using artificial intelligence.

21. The computer-implemented method of claim 1, wherein determining the emotional state of the user comprises using trained machine learning algorithm with historical user facial expressions with associated emotional state of the user to determine the emotional state.

22. The computer-implemented method of claim 1 further comprising:
   causing to display the emotional state of the user to other users;
   receiving improvement tips from the other user; and
   displaying the behavioral information to the user.

23. The computer-implemented method of claim 1 further comprising sharing the determined emotional state associated with the user with a participant of a conference based on the user selection.

* * * * *